(12) United States Patent
Klein

(10) Patent No.: US 10,279,772 B2
(45) Date of Patent: May 7, 2019

(54) SEAT BELT BUCKLE PRESENTER

(71) Applicant: TRW AUTOMOTIVE GMBH, Alfdorf (DE)

(72) Inventor: Artur Klein, Lorch (DE)

(73) Assignee: TRW Automotive GmbH, Alfdorf (DE)

( * ) Notice: Subject to any disclaimer, the term of this patent is extended or adjusted under 35 U.S.C. 154(b) by 154 days.

(21) Appl. No.: 15/025,306

(22) PCT Filed: Oct. 13, 2014

(86) PCT No.: PCT/EP2014/002755
§ 371 (c)(1),
(2) Date: Mar. 28, 2016

(87) PCT Pub. No.: WO2015/055292
PCT Pub. Date: Apr. 23, 2015

(65) Prior Publication Data
US 2016/0236645 A1    Aug. 18, 2016

(30) Foreign Application Priority Data
Oct. 17, 2013    (DE) .................. 10 2013 017 282

(51) Int. Cl.
*B60R 22/03* (2006.01)
*B60R 22/36* (2006.01)
*B60R 22/195* (2006.01)

(52) U.S. Cl.
CPC .................................. *B60R 22/03* (2013.01)

(58) Field of Classification Search
CPC ........ B60R 22/03; B60R 22/195; B60R 22/36
See application file for complete search history.

(56) References Cited

U.S. PATENT DOCUMENTS

| 7,997,620 B1 * | 8/2011 | Dong | ................. B60R 22/03 280/801.2 |
| 8,496,269 B2 * | 7/2013 | Holbein | ............... B60R 22/03 24/163 R |

(Continued)

FOREIGN PATENT DOCUMENTS

| DE | 3744577 | 7/1989 |
| DE | 102008021281 | 11/2006 |

(Continued)

OTHER PUBLICATIONS

Machine Translation of DE 102011011777.*

*Primary Examiner* — Barry Gooden, Jr.
(74) *Attorney, Agent, or Firm* — Tarolli, Sundheim, Covell & Tummino LLP

(57) ABSTRACT

The present invention relates to a belt buckle feeder (10) for a seat belt system of a vehicle comprising at least one spindle (14), comprising at least one bearing element (24), the bearing element (24) being arranged on one end of the spindle (14), and comprising at least one bearing surface (13) to which the bearing element (24) is adjacent, wherein the bearing element (24) is resiliency mounted to the spindle (14) such that in the case of loads above a predefined threshold the end (16) of the spindle (14) may enter into contact with the bearing surface (13) or a housing wall of the belt buckle feeder (10). Furthermore the present invention relates to a seat belt system of a vehicle.

16 Claims, 4 Drawing Sheets

(56) References Cited

U.S. PATENT DOCUMENTS

| | | | | |
|---|---|---|---|---|
| 8,777,268 B2* | 7/2014 | Holbein | ................. | B60R 22/03 280/805 |
| 2012/0299282 A1* | 11/2012 | Holbein | ................. | B60R 22/03 280/806 |
| 2013/0032653 A1* | 2/2013 | Holbein | ................. | B60R 22/03 242/390 |
| 2014/0021900 A1* | 1/2014 | Prokscha | ................ | B60R 22/03 318/478 |
| 2014/0252840 A1* | 9/2014 | Seyffert | ................. | B60R 22/03 297/468 |

FOREIGN PATENT DOCUMENTS

| | | |
|---|---|---|
| DE | 102011011778 | 8/2012 |
| DE | 102011011777 A1 * | 9/2012 |

\* cited by examiner

SEAT BELT BUCKLE PRESENTER

RELATED APPLICATIONS

This application corresponds to PCT/EP2014/002755, filed Oct. 13, 2014, which claims the benefit of German Application No. 10 2013 017 282.9, filed Oct. 17, 2013, the subject matter of which are incorporated herein by reference in their entirety.

BACKGROUND OF THE INVENTION

The invention relates to a belt buckle feeder for a seat belt system of a vehicle comprising a belt buckle and comprising a spindle drive for moving the belt buckle.

Belt buckle feeders of this type for seat belt systems are known from prior art and serve for moving the belt buckle for fastening the seat belt into a comfortable position in which insertion of the plug-in tongue into the belt buckle is facilitated and after fastening the seat belt into a retaining position in which a proper retaining function of the seat belt system is ensured and/or the belt buckle does not constrain the vehicle occupant.

The spindle of the spindle drive is supported within a frame of the belt buckle feeder by means of a radial bearing radially and with the end turned away from the drive axially on the frame. The radial bearing centrically fixes the spindle within the frame of the belt buckle feeder. In most cases the radial bearing is formed of a softer annular metal element through which the spindle extends. The axial bearing is a bearing ball received in a bearing seat in the spindle, for example, which is in point contact with a corresponding bearing surface on the frame of the belt buckle feeder and there rolls off upon rotation of the spindle. This bearing is designed to exhibit tow friction and is of advantage for the reversible functions during normal driving operation.

However, it is desirable to ensure increased self-locking of the spindle drive in restraining situations caused by crash, for in the case of crash the spindle system may be excited via highly dynamic processes, e.g. by pyrotechnic tensioning of the belt system and in this way may be caused to oscillate or rotate. In especially unfavorable marginal conditions this may result in movements, in particular in a buckle head movement, which is/are not desired, however. Although the approaches existing so far are efficient, they are still expensive and complicated.

SUMMARY OF THE INVENTION

It is the object of the invention to provide a belt buckle feeder comprising an improved axial support of the spindle, especially to the effect that in the highly dynamic processes occurring in the case of crash the spindle system of the belt buckle feeder exhibits increased self-locking.

This object is achieved, in accordance with the invention, by a belt buckle feeder comprising the features of claim 1. Accordingly, it is provided that a belt buckle feeder for a seat belt system of a vehicle is provided with at least one spindle and at least one bearing element, the bearing element being arranged at one end of the spindle, and with at least one bearing surface to which the bearing element is adjacent, wherein the bearing element is resiliency mounted to the spindle so that upon loads above a predefined threshold the end of the spindle may enter into contact with the bearing surface or with a housing wall of the belt buckle feeder.

In this way especially and according to the invention the advantage is resulting that a belt buckle feeder comprising an improved axial bearing of the spindle can be provided. In particular, it is advantageous that in the highly dynamic processes occurring in the case of crash the spindle system of the belt buckle feeder exhibits increased self-locking.

Moreover, it is also advantageous that the bearing element is safely and reliably disengaged and e.g. the edge of the bearing seat is inclined against the bearing surface. As a result it can be achieved that the belt buckle feeder has a variable axial bearing adapted to act as automatic brake within the spindle and for the spindle, respectively. At the moment when e.g. the seat belt system is tightened (for example in the case of crash), the seat belt is pulled tight and a considerable tensile force is applied to the belt buckle and thus also to the belt buckle feeder. In this way the spindle is axially moved in such way that the bearing element yields and does no longer act as axial bearing and the end of the spindle may enter into contact with the bearing surface or with a housing wall of the belt buckle feeder. Thus the axial bearing of the spindle is inhibited or blocked and the system acts as a brake and a movement of the spindle is prevented or at least strongly decelerated. Hence the system is self-inhibiting.

The bearing surface may be a bearing surface provided in or, resp., at the housing wall of the belt buckle feeder. It is also imaginable, however, that the bearing surface is provided e.g. by a bearing plate of a fixing element for supporting the spindle.

Preferably, the bearing element may be provided to be movably arranged at the end of the spindle and to rest via a deformable element at least partially on the same or, resp., to be supported at least partially by a deformable element. The use of a deformable element advantageously enables in an inexpensive way to predetermine a threshold at which the end of the spindle may enter into contact with the bearing surface or a housing wall of the belt buckle feeder. The threshold is reached, for example, when the deformable element deforms and thus the bearing element is no longer supported by the deformable element in the original position and therefore displaces or is displaced relative to the end of the spindle.

It is moreover imaginable that at the end of the spindle a bearing seat is provided into which the bearing element and/or the deformable element is/are inserted, wherein the bearing seat is preferably arranged to be or include a cylindrical bore. A bearing seat into which the bearing element and/or the deformable element can be inserted permits simple manufacture and assembly. A cylindrical bore for the bearing seat permits simple but at the same time highly accurate manufacture, which moreover facilitates the adjustment of the bearing tolerances. In this way it is further advantageously achieved that the bearing friction can be minimized and the efficiency of the bearing can be optimally adjusted.

In addition, the bearing element may be configured to be a bearing ball. This offers the advantage that the design is facilitated and a more expensive end complicated hardening of the spindle may be dropped at least in the end portion, for it may be sufficient, for example, to merely harden the bearing ball. Hardened bearing balls may be acquired as standard components which further reduces the costs.

Moreover it is possible that the deformable element is elastically deformable at least in parts and/or that the deformable element is and/or comprises a spring. The elastic deformability of the deformable element entails the advantage that the deformable element may return from the second state, e.g. during a functional test to the first state, i.e. into the normal operating state in which the bearing element is tilted against the bearing surface.

Also, it is imaginable that the deformable element is loosely inserted in the bearing seat. This allows for simple assembly of the deformable element, as it has to be merely inserted in the bearing seat without e.g. complicated fastening or the like being required.

In addition, the deformable element may be designed to be a so called defo element. A defo element is a deformation element and in the case of restraint, e.g. in the case of crash, allows for the bearing element to be safely and reliably disengaged and e.g. the edge of the bearing seat to be tilted against the bearing surface.

It is moreover possible that the deformable element is deformable at least in such manner that the bearing element can be completely immersed in the bearing seat. This entails the advantage that it can be safeguarded in a vary simple way that in the case of loads above a predefined threshold the end of the spindle may contact the bearing surface or a housing wall of the belt buckle feeder.

It is further imaginable that in the second state the edge of the bearing seat is or can be inclined against the bearing surface so that a braking effect can be achieved in this way. Accordingly, it is advantageously ensured that any further movement of the spindle is impossible and the tightening of the restraint system can be improved and reinforced.

Moreover, it may be provided that following pyrotechnic tightening of the seat belt system the spindle is pushed in the direction of the bearing surface such that the bearing element is pushed back into the bearing seat by the bearing surface. Hereby the deformable element is deformed such that the bearing element is inserted into the bearing seat by the bearing surface.

The present invention further relates to a seat belt system of a vehicle comprising the features of claim 10. Accordingly, a seat belt system of a vehicle is configured to be provided with at least one belt buckle feeder according to any one of the claims 1 to 9.

BRIEF DESCRIPTION OF THE DRAWINGS

Further features and advantages of the invention will be evident from the following description and from the following drawings which are referred to and in which.

DESCRIPTION

Figure 1:
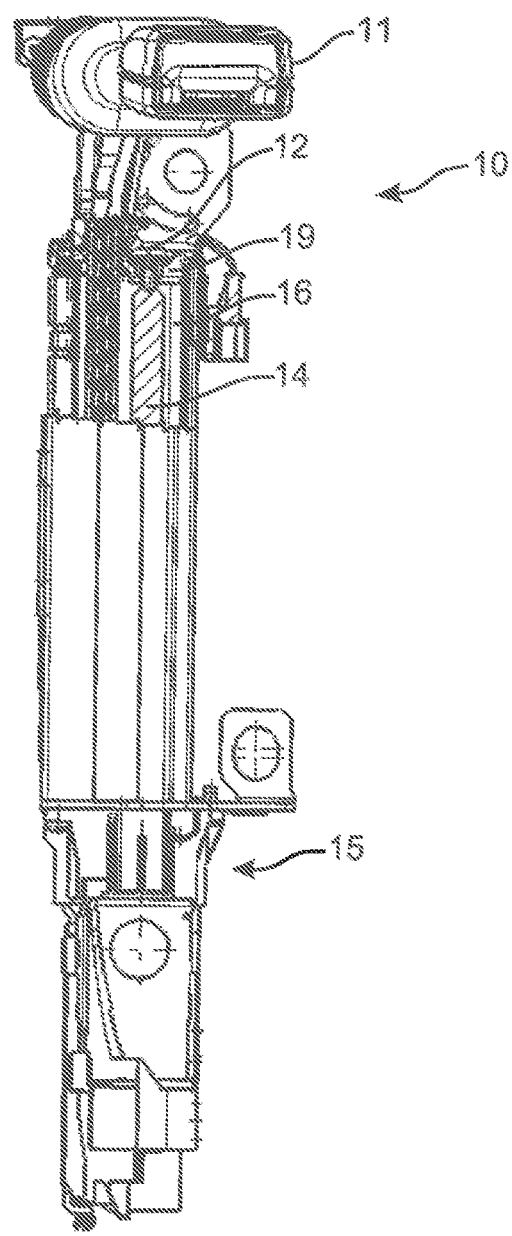
FIG. 1 shows a top view onto an embodiment of a belt buckle feeder according to the invention of a seat belt system according to the invention of a vehicle.

In FIG. 1 a top view onto an embodiment of a belt buckle feeder 10 according to the invention of a seat belt system according to the invention of a vehicle is shown which includes a frame 12 and a belt bookie 11. A spindle 14 that is driven via a drive (not shown) is supported in the frame 12. The drive is arranged on a first end 15 of the spindle 14. On the opposite end 16 the spindle 14 is supported on the frame 12 of the belt buckle feeder 10 by a support 19. Details of the support 19 are explained by way of the FIGS. 2 and 3.

Figure 2:
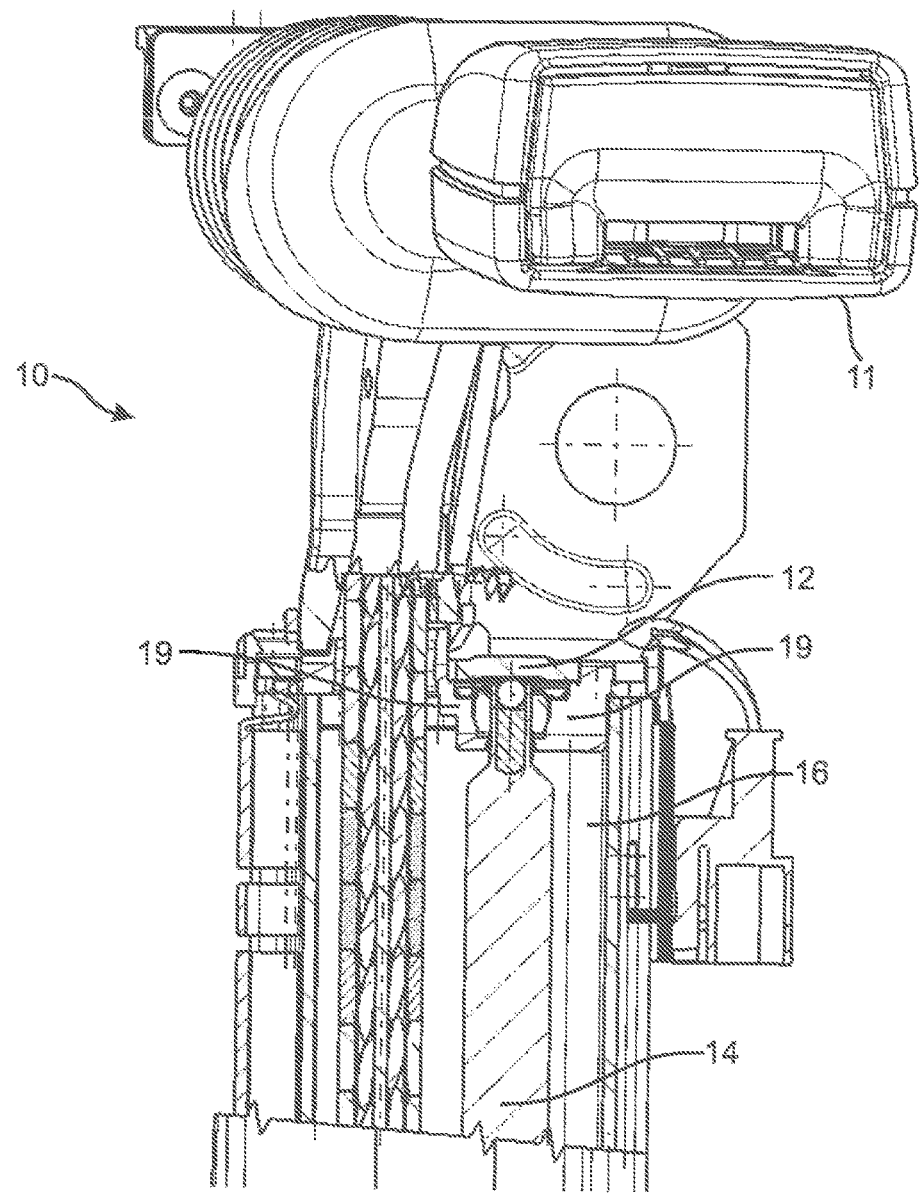
FIG. 2 shows a top view onto the end comprising the belt buckle of the belt buckle feeder according to FIG. 1 with a sectional view of one end of the spindle.
Figure 3:
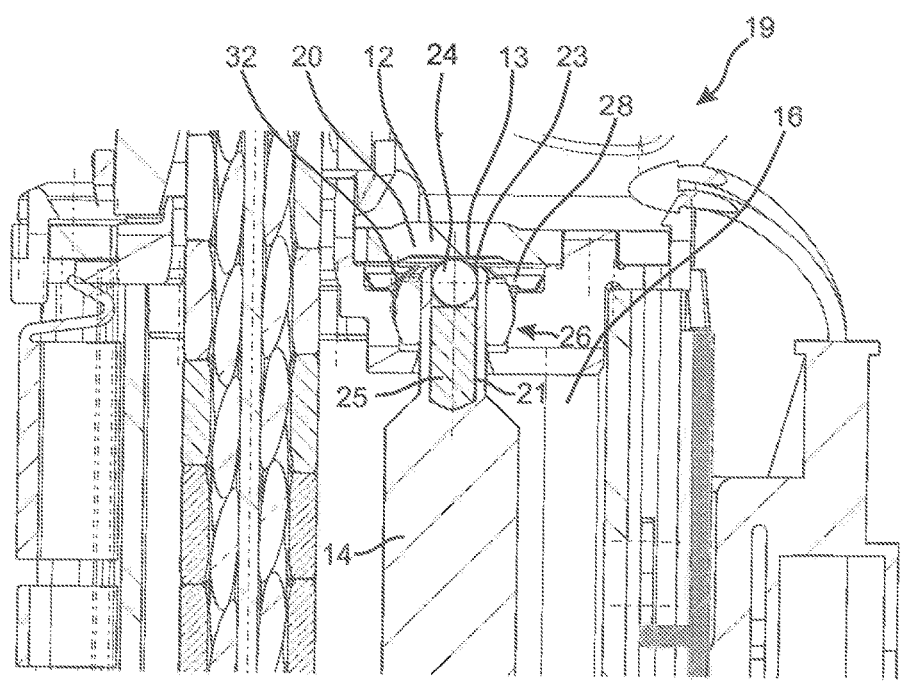
FIG. 3 shows another top view onto the end comprising the belt buckle of the belt buckle feeder according to FIG. 1 with a sectional view of one end of the spindle.

In FIGS. 2 and 3 a sectional view of the support 19 of the spindle 14 at the end 16 is shown. FIG. 3 illustrates an enlarged cutout from FIG. 2.

The support 19, on the one hand, is an axial bearing 20 formed by the contact of a bearing element 24 configured at the end of the spindle 14 in the form of a hardened bearing ball 24 with the frame 12. For this, the frame 12 includes a bearing surface 13 against which the bearing element 24 is inclined and thus is in point contact with the bearing surface 13. The axial bearing 20 thus is configured as a toe bearing having point contact between the frame 12 and the bearing ball an intermediate element, e.g. a hardened bearing plate, may be provided.

The bearing ball 24 further is guided within the bearing seat 21 which is a cylindrical bore provided at the end 16 of the spindle 14 distant from the spindle drive. The bearing ball 24 and the bearing seat 21 are in line contact.

Beneath the bearing element 24 further a deformable element 25 is provided which is formed and arranged in the bearing seat 21 such that in a first state it attempts to press the bearing ball 24 out of the bearing seat 21 so that the bearing ball 24 is inclined against the bearing surface 13.

Moreover the support 19 includes a radial bearing 26 which is radially supported within the frame 12. For fixing the radial bearing 26 in the frame 12 a fixing element 28 which, on the one hand, springs the radial bearing 28 and, on the other hand, may be part of the axial bearing 20 is provided.

The fixing element 28 may be arranged, for this purpose, between the bearing ball 24 and the frame 12, which is not mandatory, however. In such case the bearing surface against which the bearing ball 24 is inclined may be part of the fixing element 28. The bearing surface in this case then contacts, for example, the frame 12 and rests on the frame 12, respectively. The fixing element 28 further includes webs 32 springing the radial bearing 28 or the spindle 14 and axially applying the radial bearing 26 against a stop of the frame 12 so that the radial bearing 26 is axially supported free from play. For this, the webs 32 are elastically configured so as to permit springing of the radial bearing 28.

Accordingly, the fixing element 28 is provided for fixing the radial bearing 26 and may be arranged as part of the axial bearing 20 in or, resp., on the frame 12 of the belt buckle feeder 10.

The bearing element 24 is resiliency arranged on the spindle 14 so that upon loads above a predefined threshold a second state is reached in which the bearing ball 24 is pressed into the bearing seat 21 and the end 16 of the spindle 14 may enter into contact with the bearing surface 13 or a housing wall of the belt buckle feeder 10.

The deformable element 25 may be inserted into the bearing seat 21 at least partially in an elastically deformable and loose manner.

In the embodiment shown in the Figures it is provided, however, that the deformable element 25 is a defo element. Said defo element is deformable such that the bearing ball 24 can be completely immersed into the bearing seat 21.

In this way, in the second state the end 16 of the spindle 14, viz. in this case the bearing seat 21 with its edge 23, is inclined against the bearing surface 13 so that a braking effect for the spindle 14 can be achieved by increased friction which assists self-locking.

Following pyrotechnic tightening of the seat belt system, due to the design forces moving the spindle in the axial direction are acting on the spindle 14. At the moment when e.g. the seat belt system is tightened (for example in the case of crash), the seat belt is tightened and accordingly considerable tensile force is applied to the belt buckle 11 and thus also to the belt buckle feeder 10.

Hereby the spindle 14 is shifted in the direction of the bearing surface 13 such that the bearing element 24 is pushed back into the bearing seat 21 by the bearing surface 13 so that the deformable element 25 is deformed such that the bearing element 24 can be functionally disengaged from the bearing surface 13, i.e. the bearing element 24 and the bearing surface 13 are still in contact with each other but do no longer act as axial bearing.

Figure 4:
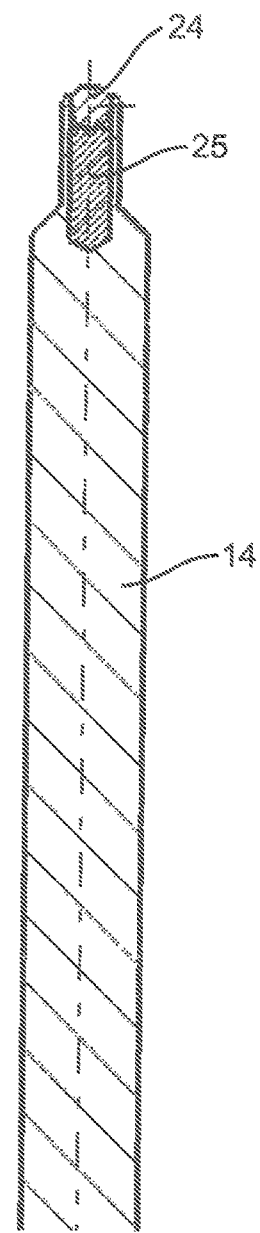
FIG. 4 shows a sectional view of the spindle of the belt buckle feeder according to the invention.

FIG. 4 illustrates an enlarged sectional view of the spindle 14 of the belt buckle feeder according to the invention, it is clearly visible that in this case the bearing seat 21 is a cylindrical bore into which the deformable element 25 is inserted.

The invention claimed is:

1. A belt buckle feeder (10) for a seat belt system of a vehicle comprising:
    a spindle (14),
    a bearing element (24) arranged on and axially movable relative to one end (16) of the spindle (14), and
    a bearing surface (13) to which the bearing element (24) is adjacent, the bearing element (24) being resiliently arranged on the spindle (14) such that in a case of loads above a predefined threshold in response to a pyrotechnic tightening of the seat belt system the one end (16) of the spindle (14) enters into contact with the bearing surface (13) or with a housing wall of the belt buckle feeder (10).

2. The belt buckle feeder (10) according to claim 1, wherein the bearing element (24) is a bearing ball.

3. A seat belt system for a vehicle comprising at least one belt buckle feeder (10) according to claim 1.

4. The belt buckle feeder (10) according to claim 1, wherein the bearing element (24) is supported at least partly by a deformable element (25) that allows for axial movement of the bearing element (24) relative to the one end (16) of the spindle (14) in response to a pyrotechnic tightening of the seat belt system.

5. The belt buckle feeder (10) according to claim 4, wherein the deformable element (25) is at least partly elastically deformable.

6. The belt buckle feeder (10) according to claim 4, wherein the deformable element (25) is a spring.

7. The belt buckle feeder according to claim 4, wherein the deformable element is loosely inserted in the bearing seat.

8. The belt buckle feeder (10) according to claim 4, wherein at the one end (16) of the spindle (14) a bearing seat (21) is provided into which at least one of the bearing element (24) and the deformable element (25) is inserted, wherein the bearing seat (21) includes a cylindrical bore.

9. The belt buckle feeder (10) according to claim 8, wherein the deformable element (25) is deformable at least in such way that the bearing element (24) can be completely immersed in the bearing seat (21).

10. The belt buckle feeder (10) according to claim 8, wherein in a second state the bearing seat (21) is inclined or can be inclined with an edge (23) against the bearing surface (13) so that a braking effect can be achieved in this way.

11. The belt buckle feeder according to claim 8, wherein the bearing seat receives both the bearing element and the deformable element.

12. A belt buckle feeder (10) for a seat belt system of a vehicle comprising:
    a spindle (14) having an end (16) including a bearing seat (21) with a cylindrical bore,
    a bearing element (24) supported at least partly by a deformable element (25) for axial movement relative to the end (16) of the spindle (14), at least one of the bearing element (24) and the deformable element (25) being inserted into the bearing seat (21), and
    a bearing surface (13) to which the bearing element (24) is adjacent, the bearing element (24) being resiliently arranged on the spindle (14) such that in a case of loads above a predefined threshold in response to a pyrotechnic tightening of the seat belt system the end (16) of the spindle (14) enters into contact with the bearing surface (13) or with a housing wall of the belt buckle feeder (10)
    wherein following the pyrotechnic tightening of the seat belt system the spindle (14) is pushed in the direction of the bearing surface (13) such that the bearing element (24) is pushed back into the bearing seat (21) by the bearing surface (13) so that the deformable element (25) is deformed such that the bearing element (24) is inserted into the bearing seat (21) by the bearing surface (13).

13. A belt buckle feeder for a seat belt system of a vehicle including a frame, comprising:
    a spindle having first and second ends, the first end including a bearing seat into which a bore extends;
    a bearing element received in the bore and axially movable relative to the spindle; and
    a deformable element received in the bore for positioning the bearing element into engagement with a surface of the frame, wherein the spindle is axially movable in response to pyrotechnic tightening of the seat belt system to deform the deformable element such that the first end of the spindle moves into engagement with the surface of the frame.

14. The belt buckle feeder according to claim 13, wherein the bearing element is positioned entirely within the bore when the first end of the spindle engages the surface of the frame.

15. The belt buckle feeder according to claim 13 wherein the bearing element is a ball bearing in contact with the deformable element within the bore.

16. The belt buckle feeder according to claim 13 wherein the bearing seat includes an inclined edge for engaging the surface of the frame in response to pyrotechnic tightening of the seat belt system to apply braking to the axially moving spindle.

* * * * *